United States Patent [19]

Bosinoff et al.

[11] Patent Number: 5,031,124

[45] Date of Patent: Jul. 9, 1991

[54] METHOD FOR SELECTING COMPUTER STORAGE DEVICES FOR COMPUTER APPLICATIONS

[75] Inventors: Philip R. Bosinoff; Charles M. White, both of San Jose, Calif.

[73] Assignee: International Business Machines Corporation, Armonk, N.Y.

[21] Appl. No.: 492,438

[22] Filed: Mar. 13, 1990

Related U.S. Application Data

[63] Continuation of Ser. No. 241,518, Sep. 7, 1988, abandoned.

[51] Int. Cl.$^5$ .......................... G06F 15/46; G06F 9/00
[52] U.S. Cl. .............................. 364/551.01; 364/514; 364/200; 364/246; 364/246.1; 364/243; 364/900; 364/968; 364/964
[58] Field of Search ................... 364/514, 550.01, 200, 364/900

[56] References Cited

U.S. PATENT DOCUMENTS

| | | | |
|---|---|---|---|
| 4,570,225 | 2/1986 | Lundy | 364/551.01 |
| 4,716,541 | 12/1987 | Quatse | 364/900 |
| 4,748,573 | 5/1988 | Sarandrea et al. | 364/551.01 |
| 4,769,761 | 9/1988 | Downes et al. | 364/514 |
| 4,771,391 | 9/1988 | Blasbalg | 364/514 |
| 4,805,089 | 2/1989 | Lane et al. | 364/551.01 |
| 4,882,642 | 11/1989 | Tayler et al. | 364/900 |

OTHER PUBLICATIONS

Roger G. Fordham, *How VME System Configuration Parameters Affect UNIX Operating System Performance*, pp. 368-376.

T. B. Genduso & J. R. Rodriguez, IBM Technical Disclosure Bulletin, *Synthetic Floating-Point Workloader*, vol. 28, No. 12, May 1986.

IBM Technical Disclosure Bulletin, *Evaluating Advanced Time Sharing Systems*, vol. 14, No. 5, Oct. 1971.

Reinhold P. Weicker, *Dhrystone: A Synthetic Systems Programming Benchmar*, vol. 27, No. 10, Oct. 1984, pp. 1013-1030.

University of Mass. Amherst, *Comparison of Gibson Mix with Umass Mix*, Publication No. TN/RCC/004, Nov. 1969.

H. J. Curnow & B. A. Wichmann, *A Synthetic Benchmark*, vol. 19, No. 1 (The Computer Journal) pp. 43-49.

Makato Kobayashi, *Dynamic Profile of Instruction Sequences for The IBM/370*, vol. C32, No. 9, Sep. 1983, pp. 859-861 (IEE Transactions on Computers).

Caxton C. Foster et al., *Measures of OP-Code Utilization*, pp. 582-584, May 1971.

Primary Examiner—Parshotam S. Lall
Assistant Examiner—Brian M. Mattson
Attorney, Agent, or Firm—Blakely, Sokoloff, Taylor & Zafman

[57] ABSTRACT

A method selects a storage system, performed by assigning values to preselected parameters relating to each storage system under review. Several performance factors are calculated, each performance factor being based upon one or more of the selected parameters. The performance factors are multiplied to derive a product which represents a single figure of merit.

12 Claims, 2 Drawing Sheets

METHOD FOR SELECTING COMPUTER STORAGE DEVICES FOR COMPUTER APPLICATIONS

This is a continuation of application Ser. No. 241,518 filed 9/7/88 now abandoned.

BACKGROUND OF THE INVENTION

1. Field of the Invention

The present invention relates to a method of rating a storage system by reducing a set of attributes associated with the storage system and an application to a single quantified number.

2. Description Of The Prior Art

In an analysis of performance related to a particular system or algorithm, various techniques of benchmarking are used to provide the evaluation. These various prior art benchmarking techniques are then used to provide a comparative analysis of related devices, systems or software by measuring key attributes of interest.

For example, a benchmarking technique for analyzing the floating-point performance is known as the Whetstone Benchmark. The Whetstone Benchmark, described in IBM Technical Disclosure Bulletin, Volume 28, No. 12 (see reference.1, listed below) is actually a mix of the 10 Whetstone kernels wherein each kernel represents a different type of numerical operation. The Whetstone Benchmark is used as a standard by which the floating-point performance of the different systems can be compared.

A second example is a technique for evaluating advanced time sharing systems. This technique, disclosed in IBM Technical Disclosure Bulletin, Volume 14, No. 5 (see reference 2) describes an analytical model which correlates various parameters, such as resource utilizations, mean queue lengths, response times, and throughput rates for closed systems having a finite quantity of requestors competing for the system's resources. A model is provided for each system and variables assigned to each of the system parameters are analyzed to calculate a benchmark value. Then the benchmark values of each of the competing systems are compared to evaluate the performance of each time sharing system.

In some instances, a single figure is determined from a calculation involving a multitude of parameters. Two well-known prior art techniques to arrive at a single performance figure are the Gibson Mix and the Dhrystone Benchmark. Both of these are concerned with measurement of the speed of a central processor unit (CPU). The Dhrystone Benchmark measures the speed of executing a given number of program statements on a CPU (see reference 3). The Gibson Mix refers to the mix of instructions used by a computer while executing scientific programs. The Gibson Mix is used as a workload model for a CPU (see references 4-7). The Gibson Mix provides a weighted sum as the mix of a set of instructions. Although various benchmarking techniques are known in the prior art, most of these techniques apply to CPUs or to other processing systems.

Storage systems, such as disk drives, are functionally different from processors and require a different set of parameters to benchmark attributes relating to the performance of the storage systems In the instance where a number of storage media or application alternatives are available, it would be advantageous to derive a method of comparing the performance of the various storage systems and applications. Further, if the parameters associated with the various storage systems and applications can be benchmarked to a single figure, similar to the Dhrystone and Gibson Mix benchmark figures described above, then the benchmark values can be compared to evaluate the various alternatives for the purpose of choosing the optimal storage system for each specific application or choosing the optimal file system for a specific storage system.

SUMMARY OF THE INVENTION

The present invention describes a method for rating storage systems by correlating a set of parameters associated with attributes of the storage system and computing a single figure of merit as a product of selected parameter factors. To evaluate the performance of a given storage system, such as a hard disk, a set of parameters is established and values assigned to these parameters. The establishment of the parameters also considers the associated file system and the application requirement of the storage system.

Once the parameters are established, values are assigned to the parameters depending on the attributes of the storage system in its environment. Then, using these parameter values, performance factors are calculated to derive the figure of merit. These factors measure various performance abilities such as addressability, growth reserve, efficiency and recoverability of null space relating to the storage system. Then these factors are normalized wherein the minimum accepted level is given a value of unity (1.0). Then the performance measures which are to be used in the calculation of the figure of merit are multiplied to provide the final product. This product represents a relative indication of the overall performance of the storage system. Because the factors are normalized to a value of unity for minimum acceptance, the figure of merit also is normalized to unity for minimum acceptance. If a factor cannot meet a mandatory requirement, then a default value of zero is used to represent the factor. In such a case, the resulting product of zero disqualifies the system.

Once the figure of merit is calculated for a given storage system, the same calculations can be applied to other systems. Then, the various figures of merit can be ranked to provide an ordinal ranking of the various storage systems. Because of the ordinal ranking, the figure of merit having the highest numerical value is chosen as the optimal product for the specific application.

In addition, derivatives can be calculated for each of the factors to determine which parameter element has the greatest impact in changing the overall figure of merit value.

BRIEF DESCRIPTION OF THE DRAWINGS

The foregoing and other objects, aspects and advantages of the invention will be better understood from the following detailed description of the preferred embodiment of the invention with reference to the accompanying drawing, in which.

DESCRIPTION OF THE PREFERRED EMBODIMENT OF THE INVENTION

Figure 1:
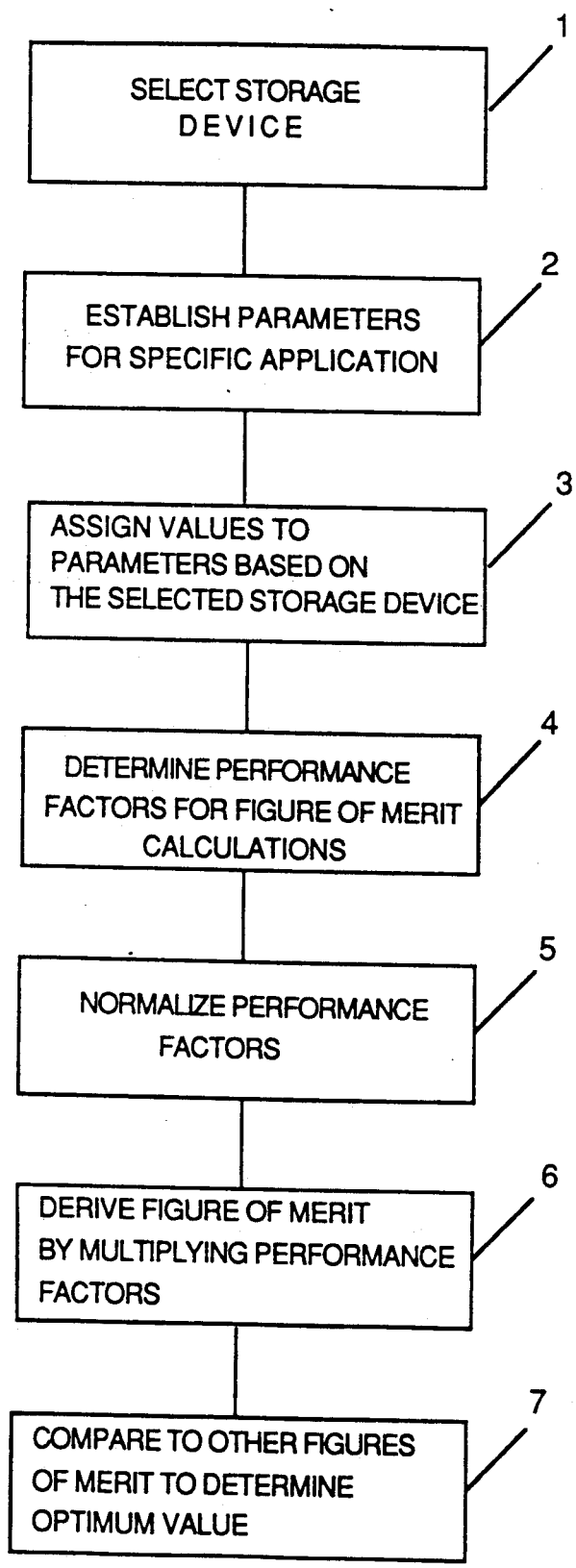
FIG. 1 is a flow diagram showing the steps of the algorithm for deriving the figure of merit of the present invention.

The present invention describes a method of rating a storage system by correlating a set of parameters and computing a single figure of merit for the storage system. In the following description, numerous specific details are set forth in order to provide a thorough understanding of the present invention. It will be obvious to one skilled in the art that the present invention may be practiced without these specific details. In other instances, well-known methods have not been described in detail in order not to unnecessarily obscure the present invention.

The present invention provides a method for assigning a single numerical quantity, known as a "figure of merit", to any system composed of a disk storage device, the file system which accesses the device, and the dedicated application, including the organization and the extent of the application data as stored on the device.

The single numerical quantity provides for an easy ordinal ranking of, and selection among, such disk storage devices and associated file systems. The convenience results from the reduction of a large number of factors to a single numerical quantity per system.

Parameters are established to measure a number of attributes associated with each storage device, its file system, and its data, as organized on the disk. Then, for each storage system, the parameters are reduced to the single figure of merit quantity per system.

The reduction of the various, multiple parameters to a single quantity allows the selection of the most optimal storage system (disk, file system, and data organization) from a set of alternative storage devices and file systems.

As implemented in the preferred embodiment, the method for rating the storage system is performed by an algorithm. The algorithm receives input values for the various parameters and computes the figure of merit for each of the storage systems. Further, in the example below, the derivation of the figure of merit is discussed in relation to the selection of a hard disk. However, the example is for illustrative purposes only and is not to be interpreted to limit the present invention. It is to be appreciated that the method for rating the performance of hard disks described below using the figure of merit of the present invention can be applied to most storage devices This rating technique addresses filler space required to reach disk boundaries, as well as reserve space on the disk. Further, it not only addresses adequacy of space, but also considers failure to re-utilize storage that no longer contains valid data. An emphasis is placed on disk capacity and optimal usage of that capacity for the given application requirement which uses a given associated file system. One such application requirement is a need for a specific amount of bytes of data.

The operation and use of a hard disk is well-known in the prior art, and therefore, elaboration on hard disk devices is not provided here. The algorithm of the preferred embodiment considers the following attributes in calculating the disk capacity figure of merit for each of the hard disk devices under consideration. Such attributes include the size of the file space required by the software, the amount of physical (formatted) capacity of the hard disk, the address space recognized by the software and the firmware, the assumed number of bad tracks on the disk (worst case distribution of bad tracks is assumed if there are no alternate track schemes), whether there is an alternate track scheme, and the size of the allocation unit (such as floppy, track or sector).

In the method of determining the disk capacity figure of merit of the preferred embodiment, certain notions related to the hard disk are to be presumed The hard disk is comprised of an integral number of tracks, wherein each formatted track supports an integral number of sectors. The exact number of sectors per track is not essential to the practice of the present invention, however, the number of sectors per track is to be fixed. For each sector, an integral number of bytes is assigned, such that each sector has the same number of bytes. The disk is capable of storing files, which may also be called volumes. These files are comprised of a number of segments, which sometimes are called extents. Typically, extents begin and terminate on track boundaries and no logical gaps exist in the track numbers within an extent. However, if an alternate track scheme is used for remapping the bad tracks, then physical gaps can exist within an extent. These physical gaps will normally not be noticeable to the application software and at most will only impact arm movement of the disk drive. Therefore, in a system without bad track remapping, extents must be composed of contiguous tracks.

For definition purpose, a bad track is any track that has at least one unreadable or one unwriteable byte. That is, if any portion of a track is unreadable or unwriteable, then the entire track is presumed unusable Further, an "alternate track scheme" is defined to be any scheme that remaps bad tracks so that the good tracks appear to the file system software as a consecutive sequence of tracks without gaps. Also, with the method of the preferred embodiment, a worst case analysis is used to determine the pattern of the bad tracks. If the number of addressable tracks is less than the physical capacity of the hard disk, then all bad tracks are assumed to fall within the addressable space. This analysis for bad track distribution is rather conservative because it assumes that bad tracks appear in the worst possible pattern. To maintain consistency, such assumptions are made uniformly to each system analyzed. In most instances, file sizes are multiples of an allocation unit, which originally was exactly the size of a floppy disk (six hundred and eight, 512 byte sectors), and an assumption is made that every volume extent is a size which is an integral multiple of the allocation unit plus the additional sectors (if necessary) to complete the volume on a track boundary.

Taking these various attributes for each hard disk, parameters are defined from these various attributes. It is to be appreciated that other hard disk attributes can be considered, such as arm movement, rotational speed, latency (response time), as well as others, and they can be readily incorporated into the calculation for the figure of merit of the present invention.

For clarity, the notion of a "floppy disk" is elaborated on before proceeding to the elaboration of the parameters and units of measurement used to derive the figure of merit.

A floppy disk, is a single, usually pliable, medium of storage, which resembles a soft phonograph record of small dimensions encased in a square envelope. Floppy disks are currently used on most personal computers (PC). The floppy disk to be mentioned in the elaboration of the preferred embodiment has a storage capacity of 608 sectors of 512 bytes each, or $608 \times 512 = 311,296$ bytes per floppy disk.

A "floppy", as used in the preferred embodiment, is simply an allocation unit of 311,296 byte size. Its relation with the physical floppy used in the PC is historical only.

The floppy disk is distinct from the disk systems for which the figure of merit is to be computed. The floppy disk is not to be analyzed; its interest lies in the fact that many hard disk systems are loaded from data that is transported via sets of floppy disks (much as data can be transported on reels of tape.) Since floppy disks have a precise capacity in bytes, many file systems assign space in terms of floppy disk units. In particular, a hard disk of one common variety, with 16 sectors per track, will require 38 consecutive tracks to accommodate the data on one floppy. Current hard disks are formatted to provide 17 sectors per track; 36 consecutive tracks are required to accommodate the data on one floppy with 4 sectors left unutilized on the 36th track. The method of the preferred embodiment provides for file space to be assigned in multiples of allocation units such as floppy disks. The preferred embodiment will also reflect the consequences of using smaller units of file allocation, such as multiples of tracks or sectors. These smaller units will generally increase the computed figure of merit since they enable an easier fitting of data between defective tracks.

The various parameters used in the calculation of the figure of merit of the preferred embodiment, as well as the values for the various parameters are provided below:

| Variable | Description | Value |
|---|---|---|
| $T$: | number of formatted tracks on a perfect disk | $0 < T$ |
| $N$: | bad tracks | $0 \leq N \leq T$ |
| $s_t$: | sectors per track | $0 < s_t$ |
| $s_f$: | sectors per floppy (standard is 608) | $0 < s_f$ |
| $T_f$: | tracks per floppy ceil $(608/17) = $ ceil $(35.76 \ldots) = 36$ | $T_f =$ ceil $(s_f/s_t)$ |
| $b_s$: | bytes per sector (standard is 512) | $0 < b_s$ |
| $b_t$: | bytes per track | $b_t = b_s * s_t$ |
| $b_f$: | bytes per floppy. | $b_f = b_s * s_f$ |
| $b_a$: | bytes per allocation unit | $b_a = b_f, b_t, b_s,$ or 1 |
| $C$: | total disk capacity, in bytes | $C = T * b_t$ |
| $D$: | avail. disk capacity, in bytes | $D = C - N * b_t$ |
| $b_L$: | bytes lost from bad tracks (depends on the unit of allocation, $b_a$, the distribution of bad tracks, the number of bytes per track, and whether or not there is an alternate track scheme) Assuming worst case distribution of bad tracks: | $N * b_t \leq b_L \leq N * b_t * T_f$ |
| | Allocation Unit    No Alternate Track    Alternate Track | |
| | $b_a = b_f$    $b_L = N * b_t * T_f$    $b_L = N * b_t$ | |
| | $b_a \leq b_t$    $b_L = N * b_t$    $b_L = N * b_t$ | |
| $A_s$: | Addressable Space, in bytes. | $0 < A_s$ |
| $A_c$: | Accessible Space, in bytes. | $A_c = $ Min$(A_s, C)$ |
| $A_v$: | Avail. bytes in address space. It is the maximum number of bytes simultaneously addressable and accessible. This quantity must be adjusted to allow for any unusable "gaps" due to bad tracks. If there is an alternate track scheme, then the distribution of bad tracks is immaterial (except for arm movement) unless $A_s < C$. Here [...] denotes the greatest integer (floor) function. | $A_v = [(A_c - b_L)/b_t] * b_t$ |
| $U$: | Capacity in bytes. Adjusted to allow for size of disk allocation unit. | $0 \leq U = [A_v/b_a] * b_a \leq D$ |
| $V$: | The number of Volumes. | $0 < V$ |
| $V_e$: | The number of Volume extents. If there are large individual volumes then lack of an alternate track scheme or file system limitations on extent size will force $V_e > V$. | $0 < V \leq V_e$ |
| $F$: | File space consumed, in bytes. Files must be floppy aligned if $b_a = b_f$. Files must be track aligned if $b_a = b_f$ or $b_t$. File space means the sum of the space required to place all the volume extents. | $0 \leq F \leq U$ |
| $S$: | Slack space, in bytes. In this context it means any space reserved for file space, but not containing information. Essentially $S = $ nulled records + unused space. An approximation is $S = 0.5 * (V * b_a + V_e * b_r)$ where $b_r$ is the average number of bytes per record for multiple-extent volumes. Generally, $0 < b_r \leq b_s$ If $s_t$ does not evenly divide $s_f$ AND $b_a = b_f$ then a better approximation is: $S = 0.5 * (V * b_a + V_e * (b_t + b_r))$ | $0 \leq S \leq F$ |

Once the parameters are set and values assigned to these parameters, then calculations can be made to determine the disk capacity figure of merit. The disk capacity figure of merit of the present invention is derived by computing a product of a number of factors. The factors are derived from the parameters and can also be regarded as parameters. However, because they are used to compute a product, these parameters are referred to as performance factors for ease of explanation. Because the figure of merit is a product of the factors, it is possible that the factors can provide different weights and provide significantly biased results In order to give equal weight to each of the factors, each factor is normalized to a value of 1.0. The normalized value of unity (1.0) designates a value for a minimal acceptance level for each factor. That is, it is desirable to have a disk configuration in which each of the factors has a rating of 1.0 or higher. Further, because the figure of merit is derived as the product of the factor terms, the figure of merit is also normalized to unity for a minimally acceptable value. That is, a figure of merit for a minimum acceptance has a value of 1.0. Conversely, a figure of merit less than unity is not acceptable.

By comparing the figures of merit for the different storage systems, an assessment can be made in ranking the systems. The figures of merit are arranged in an ordinal ranking for comparison purposes. For example, a figure of merit of 1.5 provides for a more desirable device than one which has a rating of 1.0. It is to be appreciated that this ordinal ranking of the various figures of merit is to determine the system having the highest value It is possible that in some instances a factor may have a value of less than unity, but still result in a figure of merit which is greater than unity or even to have the highest figure of merit. The selection of the optimum hard disk depends on the highest figure of merit and not necessarily the values of each individual performance factor. Where a factor may have a value of less than unity, other factors can be sufficiently above unity to "counterbalance" the low value factor, such that the overall figure of merit is above unity and, therefore, acceptable. It is also to be noted that the values for the figures of merit provide for an ordinal ranking only and does not provide an absolute quantified comparison determining the extent of superiority. For example, a figure of merit of 1.5 is not necessarily 50% better than a system having a figure of merit of 1.0.

An advantage of using a product calculation in determining a figure of merit is that a disqualification of a system for failure to meet a mandatory requirement will result in a value of 0. If a factor cannot meet a mandatory requirement, then a default value of 0 is used to represent the factor, resulting in a value of 0 for the figure of merit and, thereby, disqualifying the system from consideration. Further, the algorithm for calculating the disk capacity figure of merit provides high flexibility in its application. Factors can be readily individualized and/or modified with respect to acceptability targets. For example, percentage values for the measurement of the reserve of free disk space available for growth can be readily altered. Further, additional factors can be readily defined and inserted in the calculation of the product. As long as each of the factors is normalized to unity, the method determining the product remains unchanged. Also, if individual factors are piecewise differentiable, then the figure of merit is also piecewise differentiable. By taking the partial derivatives, it is possible to identify the factors, or parameters, for which small changes would yield the most improvement in the figure of merit. In the preferred embodiment, three factors are used to determine the disk capacity figure of merit. Measure of addressability (A), measure of reserve for growth (G) and efficiency (E) are the three factors included in the algorithm of the preferred embodiment. The definition and computation of the three factors A, G and E are described below.

MEASURE OF ADDRESSABILITY (A)

Proportion of formatted good track that is utilizable. Must be computed with respect to all good tracks. To be counted, tracks must be assignable to a volume extent. It must be possible to assign all tracks simultaneously, that is, the address space must be at least as large as the number of tracks that are counted.
Range: 0.0–1.0
Target: 1.0
Computed as: U/D

MEASURE OF RESERVE FOR GROWTH (G)

Proportion of total disk space that is not assigned to any volume and is available for additional use. Let k = the proportion of reserve space required, e.g. 0.2 (or 20%)
Range: 0.0–1.0
Target: 1.0
Computed as: $(1/k) * (U-F)/D$ for $k>0$ and $F \leq U$
Computed as: 1.0 for $k=0$ and $F \leq U$
Computed as: 0.0 for $F>U$.
The coefficient, (1/k) is chosen in order to normalize the target to unity (1.0).

Note that $k=0$ signifies that a reserve for growth is not a requirement. In general, setting a factor to unity (1.0) is equivalent to ignoring the factor.

EFFICIENCY (E)

Proportion of bytes in assigned volume space that contains information.
Range: 0.0–1.0
Target: 1.0 (100%)
Computed as: $(F-S)/F$ Although the example of the preferred embodiment calculates the product of three factors A, G and E, other factors can be incorporated in the calculation of the figure of merit as was described in the description above. Another such factor is the recoverability of null space ($R_N$).

RECOVERABILITY OF NULL SPACE ($R_N$)

Proportion of Nulled space that can be reutilized without running compression utilities.
Range:
0.1–1.0
Target:
1.0
Computed as:
- 1.0 if no file is appended until all its nulled space has been re-utilized.
- 0.0 if null space is never reutilized.
- $0.0 < R_x < 1.0$ where there is some strategy for recovering null space and $R_x$ is the minimum reutilization under worst case conditions.
- Set $R_N = \text{Max}(0.9, R_x)$ The value 0.9 sets a floor on the value of the factor for null space recoverability, and thus a cap on the penalty for a poor null space recovery scheme. The value of 0.9 is a sample value. A value of 1.0 for the cap essentially states that null space recovery is not an issue.

Note that a value of 0.0 for the cap is equivalent to defining $R_N = R_x$. In this case, complete inability to recover null space (without running compression utilities) would automatically disqualify a system. That is $R_N$, and hence, the Figure of Merit would be set to zero.

A typical value for the cap is $1-(N_b/F)$ where $N_b$ denotes the maximum amount of null space (in bytes) that is likely to accumulate between successive executions of compression utilities. Here the penalty for inability to recover nulled records is capped by the maximum expected amount of null space. Poor performance here can be compensated by a larger reserve for growth.

It is to be appreciated that other factors such as arm movement, rotational speed and latency can be calculated and included in the calculation of the disk capacity figure of merit. FIG. 1 shows a basic flow diagram for the calculation of the disk capacity figure of merit as described above.

The product of the three performance factors of addressability (A), growth reserve (G) and efficiency (E) determine a single numerical figure for the disk capacity figure of merit. A figure of merit having a value greater than or equal to unity (1.0) is acceptable, unity being the minimum acceptable value. A figure of merit less than unity represents less than the minimum level of acceptance.

Once the figure of merit has been calculated for each of the storage systems under review, then the system having the highest numerical figure of merit value is chosen as the optimal product for the specific application Then, if an improvement to the figure of merit is desired, calculations can be made to determine the impact of changing various parameters which affect the calculation of the final figure of merit. Derivatives provide the rate of change of various parameter values and, therefore, can evaluate the impact of changing a given parameter for causing a corresponding change in the figure of merit. The impact of changes in physical disk size, file system, and/or space utilization by software can be estimated from the partial derivatives listed below:

$$d/dD = -2/k * U * (U-F) * (F-S)/(F*D^3)$$

if U fixed.

$$d/dD = 1/k * (F-S)/D^2$$

if U = D.

$$d/dU = 1/k * (F-S) * (2U-F)/(F*D^2)$$

if $S \leq F \leq U \leq D$.

$$d/dF = -1/k * U * (1-t)/D^2$$

if S = t*F.

$$d/dF = 1/k * U * (U*S - F^2)/(F*D)^2$$

if S fixed.
  Positive only when (F/U < (S/F)

$$d/dS = -1 * U * (U-F)/(F*D^2) \text{ Always} \leq 0.$$

The above described method for determining a figure of merit is illustrated in the process flow shown in FIG. 1 In this illustration, the selection process is used to rank various disk drives with respect to a given application and file system. It is clear that the application and/or file system could also be varied, as alternate embodiments of this invention. In step 1, a storage device is selected for rating. In step 2, parameters are established for the specific application of the storage device Next, in step 3, values are assigned to the various parameters established in step 2. These values are based on the specific storage device selected In step 4, various performance factors are selected for the figure of merit calculation. The selected performance factors are derived from the parameters and their values of steps 2 and 3.

Then, if necessary, the performance factors are normalized in step 5 so that the normalized value of 1.0 designates a value for minimal acceptance. In step 6, the normalized performance factors are multiplied to derive a product, which is the figure of merit value of the storage device. A figure of merit of 1.0 being indicative of minimal acceptance and a value of 0 being a disqualification of the storage device.

Finally in step 7, the figure of merit for this storage device is compared to other figures of merit, which were derived equivalently using the same steps for other storage devices. The storage device having the highest numerical value of at least 1.0 for the given application is selected as having the best performance.

A PASCAL program that calculates the figure of merit is provided below. Parameters, which are comprised of variables (VAR) and constants (CONST), are established and defined. Then, calculations are made to determine the performance factors A, G and E. This calculation also accounts for an alternate track scheme. The figure of merit calculation (Merit:=A*G*E) is performed at the end of the calculation phase. Finally in the last phase, the results are provided for display.

```
CALCULATION OF FIGURE OF MERIT
    CONST
        T     =    8433;
{*      Total formatted Tracks on Hard Disk    *}
        st    =    17;
{*      Sectors per Track                      *}
        sf    =    608;
{*      Sectors per Floppy Disk                *}
        bs    =    512;
{*      bytes per Sector                       *}
        As    =    314572800;
{*      address range of file system           *}
        V     =    10;
{*      number of Volumes                      *}
        Ve    =    15;
{*      number of Volume extents               *}
        F     =    36156416;
{*      File space in bytes                    *}
        br    =    40;
{*      Average bytes per record               *}
        k     =    0.2;
{*      Reserve factor                         *}
        out   =    'merit.out';
{*      Output file for Results                *}
    TYPE
        tracks = longint;
        bytes  = longint;
        factor = real;
        product = real;
    VAR
        Tf   : tracks;
{*      Tracks per Floppy Disk                 *}
        N    : tracks;
{*      Number of bad tracks on Hard Disk      *}
        bt   : bytes;
{*      bytes per Track                        *}
        bf   : bytes;
{*      bytes per Floppy Disk                  *}
        ba   : bytes;
{*      Disk space allocation unit             *}
        C    : bytes;
{*      Total Disk Capacity                    *}
        D    : bytes;
{*      Physically available bytes             *}
        bL   : bytes;
{*      bytes lost from bad tracks             *}
        Ac   : bytes;
{*      bytes effectively accessible           *}
        Av   : bytes;
{*      Available bytes within address space   *}
        U    : bytes;
{*      Utilizable byte capacity               *}
        S    : bytes;
```

CALCULATION OF FIGURE OF MERIT

```
{*      Slack space - allocated but unused      *}
        A       : factor;
{*      Measure of Addressability               *}
        G       : factor;
{*      Measure of Growth Reserve               *}
        E       : factor;
{*      Efficiency of space utilization         *}
        M       : product;
{*      Figure of Merit                         *}
        i,j     : integer;
{*      counting indices                        *}
        RESULTS:TEXT;
{*      Output file                             *}
        FUNCTION Minimum(a,b:longint):longint;
        BEGIN
                IF b < a THEN Minimum := b
                ELSE Minimum := a;
        END {*Minimum*};
        FUNCTION Maximum(a,b:longint):longint;
        BEGIN
                IF b > a THEN Maximum := b
                ELSE Maximum := a;
        END {*Maximum*};
        FUNCTION
Merit(N:tracks;alloc_unit:integer;alternate:boolean)
:real;
        BEGIN
{*              T   is 8433                     *}
{*              N   is an input parameter       *}
{*              st  is 17                       *}
{*              sf  is 608                      *}
                Tf := sf DIV st;
                IF (sf MOD st) > 0 THEN Tf := Tf + 1;
{*              bs  is 512                      *}
                bt := bs*st;
                bf := bs*sf;
                CASE alloc_unit OF
                        0:      ba := bf;
                        1:      ba := bt;
                        2:      ba := bs;
                        3:      ba := 1;
                END;
                C := T*bt;
                D := C-N*bt;
                IF alternate THEN bL := N*bt
                        ELSE IF ba < bf THEN bl := N*bt
                                ELSE bL := N*bt*Tf;
{*              As is   314572800               *}
                Ac := minimum(As,C);
                Av := ((Ac-bL) DIV bt)*bt;
                U := (Av DIV ba)*ba;
{*              V  is 10                        *}
{*              Ve is 15                        *}
{*              F  is 36156416                  *}
                S := (V*ba + Ve*br) DIV 2;
                IF ((sf MOD st) > 0) and (ba = bf)
                        THEN S := (V*ba + Ve*(bt+br)) DIV 2;
                A := U/D;
                IF F > U THEN G := 0
                        ELSE IF k > 0 THEN G := (U-F)/(D*k)
                                ELSE G := 1.0;
                E := (F-S)/F;
                Merit := A * G * E;
        END {*Merit*};
        BEGIN
                ASSIGN(RESULTS,out); rewrite(RESULTS);
                writeln(RESULTS,'.x:4');
        {* Set left margin for laser printer *}
writeln(RESULTS,'Exhibit of Figure of Merit
Calculations');
FOR i := 0 TO 3 DO BEGIN
        writeln(RESULTS);
        CASE i OF
                0:writeln(RESULTS,'Allocation Unit is
Floppy Disk');
                1: writeln(RESULTS,'Allocation Unit is
Hard Disk Track');
                2: writeln(RESULTS,'Allocation Unit is
Hard Disk Sector');
                3: writeln(RESULTS,'Allocation Unit is
One Byte');
```

CALCULATION OF FIGURE OF MERIT

```
                END;
                FOR j := 0 TO 1 DO BEGIN
                        CASE j OF
                                0: writeln(RESULTS,'No Alternate
Track Scheme');
                                1: writeln(RESULTS,'Alternate
Track Scheme');
                        END;
                FOR N := 0 TO 5 DO
                        writeln(RESULTS,Merit(N,i,(j=1)));
                        M := Merit(5,i,(j=1));
                        writeln(RESULTS,'Ac=',Ac:10,' As=',As:10,'
Av=',Av:10);
                        writeln(RESULTS,'ba=',ba:10,' bf=',bf:10,'
bL=',bL:10,' br=',br:10);
                        writeln(RESULTS,'bs=',bs:10,' bt=',bt:10);
                        writeln(RESULTS,' C=', C:10,' D=', D:10,'
F=', F:10);
                        writeln(RESULTS,' k=', k:10,' N=', N:10,'
S=', S:10);
                        writeln(RESULTS,'sf=',sf:10,' st=',st:10);
                        writeln(RESULTS,' T=', T:10,' Tf=',Tf:10);
                        writeln(RESULTS,' U=', U:10,' V=', V:10);
                        writeln(RESULTS,' A=', A,  ' G=', G,   ' E='
,E,     ' M=', M);     END;
                END;
                FLUSH(RESULTS);
        END {*Figure of Merit Program*}.
```

Thus, by determining various parameters attributable to storage devices under analysis, values can be assigned to these parameters and by using these parameter values, factors can be calculated These factors are then used to produce a product representing the figure of merit of a given storage device.

The figure of merit of each storage device can be compared, and the device having the highest figure of merit value is selected as the optimum system for the specific use and for the specific application chosen. As requirement constraints change, the factors can take into account other parameters to drive a different figure of merit value.

The normalized product method offers benefits of convenience and flexibility beyond the weighted sum method. In contrast to the weighted sum method (such as used in computing the Gibson Mix in the prior art), the normalized product method allows for easy modification of a computed figure of merit through the introduction of, and multiplication by, additional performance factors. In the weighted sum method, it would generally be necessary to recompute the previously defined weights and to resume the previously defined terms.

Further, the algorithm for determining the figure of merit of the present invention is implemented on a computer. The various parameters, parameter values, and algorithm are stored, such as in a memory coupled to the processor. Calculations are performed in the processor, and all parameters, values and calculated results are generated in an output format including video screen and printed spreadsheets.

The aforementioned method can be used in a repetitive fashion to cyclically process a variety of storage devices and applications in an effort to find the optimal match.

Figure 2:
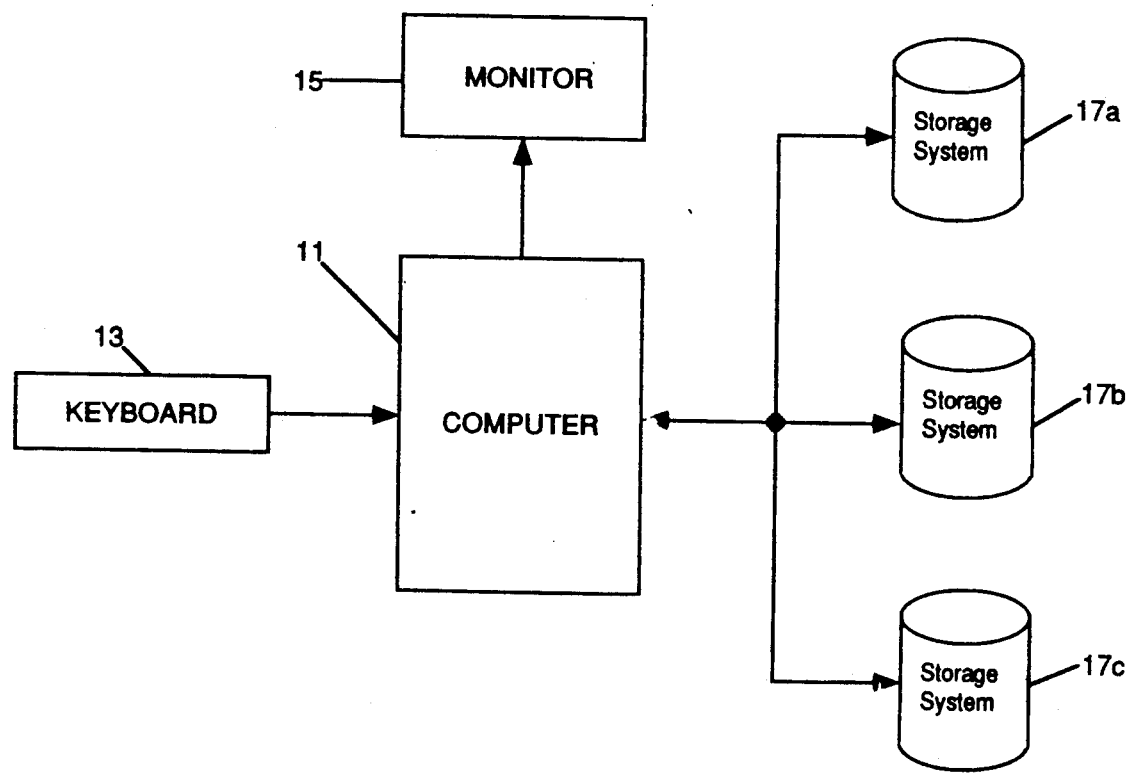
FIG. 2 is a block diagram showing a computer system in conjunction with which the claimed invention may be implemented.

FIG. 2 is a block diagram representation of a computer system which may be used to implement the present invention. In particular, computer 11 includes a processor, memory and operating system capable of executing the Pascal program set forth above for calculating the figure of merit. Coupled to the computer are a keyboard 13 for a user to enter commands and a monitor 15 to display the results of calculations performed by computer 11. Storage system 17a, 17b and 17c are hard disc drives or storage device with a file system and data. Each of the elements shown in FIG. 2 are readily available, off the shelf components, the only requirement being that the computer system must be capable of compiling and executing the Pascal program or comparable program written in another programming language.

While the invention has been described in terms of a preferred embodiment in a specific environment, those skilled in the art will recognize that the invention can be practiced, with modification, in other and different environments within the spirit and scope of the appended claims.

Having thus described our invention, what we claim as new and desire to secure by Letters Patent is set forth in the following claims:

1. A method of selecting one of a plurality of storage systems using a programmed computer, for use in connection with a preselected application, said method comprising the steps of:
   (a) establishing a set of parameters with respect to one of said plurality of storage systems and said application,
   (b) assigning values to each parameter in said set,
   (c) calculating performance factors based upon the assigned value of said parameters,
   (d) multiplying said performance factors to derive a figure of merit,
   (e) repeating steps (a)–(d) with respect to each of the other storage systems of said plurality of storage systems,
   (f) comparing the figures of merit derived for each of said plurality of storage systems and creating a list of said plurality of storage systems in descending order of values of figures of merit, and
   (g) displaying said list and selecting the storage system having the highest figure of merit.

2. The method of claim 1 further including the steps of assigning a value ob 1.0 as a minimally acceptable rating for each of said performance factors.

3. The method of claim 1 further including a step of calculating derivatives of said parameters to determine those parameters having most significance in causing a change in said figure of merit.

4. The method of claim 2 further including the step of assigning a value of less than 1.0 for each of said performance factors which fail to meet said minimally acceptable rating.

5. The method of claim 4 further including the step of assigning a value of at least 1.0 for each of said performance factors which at least meets said minimally acceptable rating.

6. The method of claim 5 further including the step of assigning a value for each of said performance factors meeting said minimally acceptable rating such that each assigned value is proportional to an amount by which each said performance factor exceeds said minimally acceptable rating.

7. The method of claim 6, wherein said step of multiplying said performance factors comprises the step of multiplying each of said assigned values such that a figure of merit of 1.0 indicates meeting a minimally acceptable requirement; a figure of merit less than 1.0 indicates a failure to meet said minimally acceptable requirement; and a figure of merit greater than 1.0 indicates that the storage system exceeds said minimally acceptable requirement.

8. The method of claim 7 further including the step of applying another set of parameters when said figure of merit has a value of a least 1.0.

9. The method of claim 8, wherein said step of establishing a set of parameters further includes the step of selecting said parameters based on:
   (a) size of file space utilized by a program of said application;
   (b) amount of physical capacity of one of said plurality of storage systems;
   (c) address space recognized by said program;
   (d) number of bad tracks of one of said plurality of storage systems; and
   (e) use of an alternate track scheme by one of said plurality of storage systems.

10. The method of claim 8 further including the step of categorizing one of said plurality of storage systems, having a value of said figure of merit which is less than 1.0, as unacceptable.

11. The method of claim 9, wherein said step of calculating performance factors based upon values of predetermined parameters, includes the step of selecting said predetermined parameters based on:
   (f) a measure of addressability which is defined as a ratio of addressable space within formatted tracks of one of said plurality of storage systems which are utilizable to an amount of physical capacity of one of said plurality of storage systems;
   (g) a measure of reserve growth which is defined as a proportion of unassigned space of one of said plurality of storage systems available for additional use; and
   (h) efficiency, which is defined as a proportion of assigned space of one of said plurality of storage systems containing information.

12. The method of claim 11 further including the step of assigning a value of 0.0 to each unacceptable performance factor, such that a subsequent multiplying step causes a figure of merit of 0.0.

* * * * *

UNITED STATES PATENT AND TRADEMARK OFFICE
CERTIFICATE OF CORRECTION

PATENT NO. : 5,031,124
DATED : July 9, 1991
INVENTOR(S) : Bosinoff et al.

It is certified that error appears in the above-indentified patent and that said Letters Patent is hereby corrected as shown below:

Column 13, line 45, claim 2, change "ob" to --of--.

Signed and Sealed this

Twenty-third Day of May, 1995

Attest:

BRUCE LEHMAN

*Attesting Officer*  *Commissioner of Patents and Trademarks*